Jan. 27, 1970  A. C. MAGUIRE  3,491,970
AIRCRAFT POWER PLANT

Filed April 15, 1968  2 Sheets-Sheet 1

INVENTOR
ADDISON CHARLES MAGUIRE

By Cushman, Darby & Cushman
ATTORNEYS

United States Patent Office 3,491,970
Patented Jan. 27, 1970

3,491,970
AIRCRAFT POWER PLANT
Addison C. Maguire, Derby, England, assignor to Rolls-Royce Limited, Derby, England, a British company
Filed Apr. 15, 1968, Ser. No. 721,412
Claims priority, application Great Britain, May 24, 1967, 24,216/67
Int. Cl. B64c 15/14
U.S. Cl. 244—52
5 Claims

ABSTRACT OF THE DISCLOSURE

Aircraft power plant comprising a vertical lift jet engine beneath whose final nozzle there are mounted a plurality of vanes which are pivotally movable to vary the direction of flow of the exhaust gases, means for effecting pivotal movement of the vanes, and means for moving the vanes between a first position, in which they are immediately adjacent to the final nozzle, and a second position in which they remain in the path of the exhaust gases but are spaced from the final nozzle.

---

This invention concerns aircraft power plant.

According to the present invention, there is provided aircraft power plant comprising at least one vertical lift engine having a final nozzle, a plurality of vanes, each of said vanes being substantially elliptical in cross section and pivotally mounted about an axis perpendicular to the plane of said vane cross section and remote from the point of intersection of the major and minor axes of said vanes, said vanes being mounted adjacent said final nozzle, means for causing each said vane to move about said mounting axis to vary the direction of flow from said final nozzle, and moving means for moving said vanes from a first position immediately adjacent said final nozzle to a second position spaced from said final nozzle a predetermined distance while remaining in the flow path of said exhaust gases.

The term "vertical lift jet engine" as used in this specification, is to be understood to mean a jet engine which is adapted to produce vertical lift forces on an aircraft independently of those generated aerodynamically by forward flight of the aircraft. For this purpose, the engine may, for example, have a thrust to weight ratio of at least 16:1.

In the case of the present invention, since the said vanes may be moved to the said second position, it may be arranged that they constitute no significant obstruction to, and thus do not choke, the flow of exhaust gases from the final nozzle.

The vanes are preferably carried by a common frame, means being provided for pivoting the frame so as to move the said vanes between the said first and second positions.

The engine may be a fan engine whose fan air annularly surrounds the exhaust gases, the vanes being pivotally movable to vary the direction of flow of both the fan air and the exhaust gases, and the vanes remaining in the path of both the fan air and the exhaust gases when moved into the said second position.

Each vane may be pivotally moved through a predetermined angle (e.g. of 5°) to either side of an axis perpendicular to the plane of the frame.

The invention also comprises an aircraft provided with at least one power plant as set forth above, the engine of the or each said power plant being vertically mounted.

Figure 1:
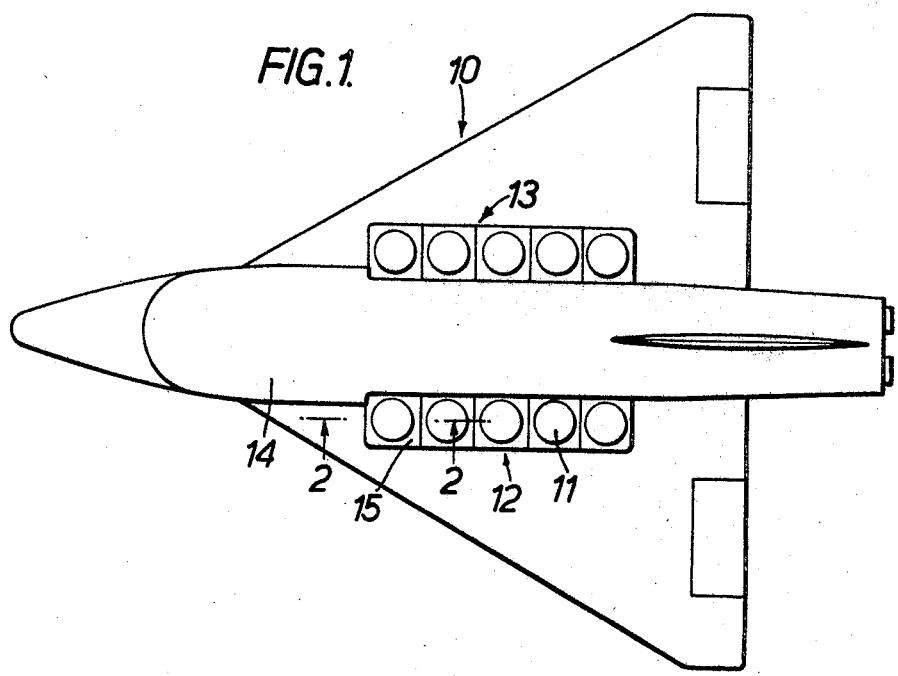
Figure 2:
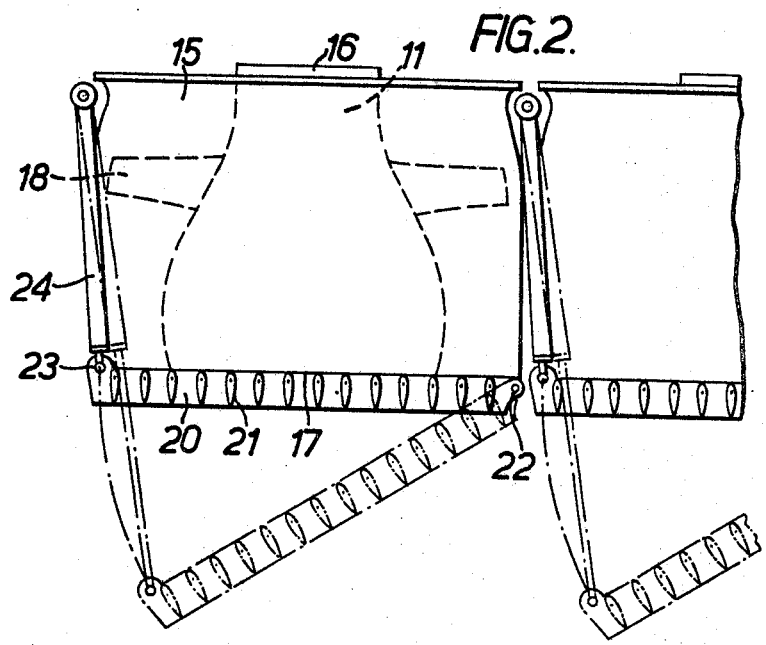
Figure 3:
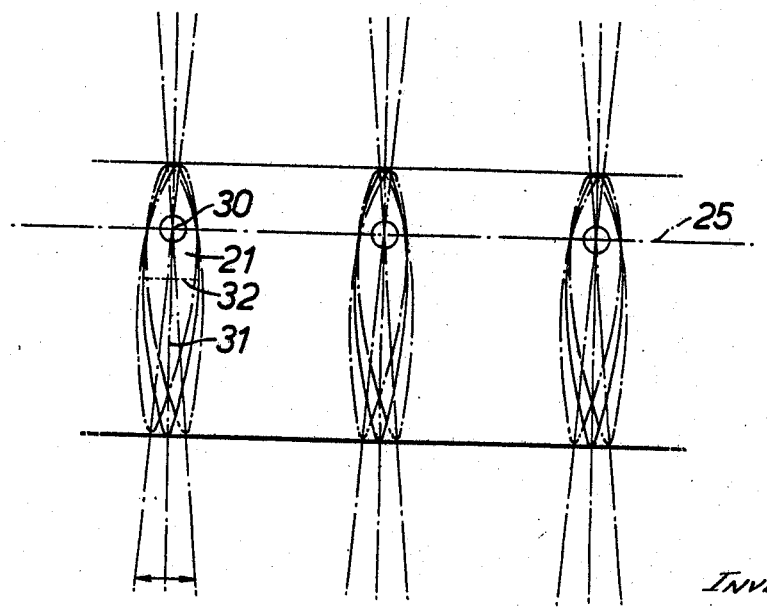

The invention is illustrated, merely by way of example, in the accompanying drawings, in which:

FIGURE 1 is a diagrammatic plan view of an aircraft provided with aircraft power plant in accordance with the present invention, FIGURE 2 is a broken-away diagrammatic sectional view taken on the line 2—2 of FIGURE 1, and FIGURE 3 is a view showing part of the structure of FIGURE 2 on a larger scale.

Referring to the drawings, an aircraft 10, which is adapted for vertical take-off and landing, is provided with vertical lift gas turbine jet engines 11, the engines 11 being arranged in two banks 12, 13 of five engines 11, the banks 12, 13 being arranged on opposite sides of the aircraft fuselage 14. Each of the engines 11 is mounted in an engine bay 15.

As shown in FIGURE 2, each of the engines 11 has an air inlet 16, which projects just beyond the top of the respective engine bay 15, and a final nozzle 17 through which flow the turbine exhaust gases. Each of the engines 11 is, moreover, a fan engine provided with fan blades 18, the fan air annularly surrounding the exhaust gases. Mounted beneath the final nozzle 17 of each engine is a frame 20 which carries a plurality of pivotally mounted vanes 21. Each frame 20 is pivotally connected to the bottom of the wall of the engine bay 15 by having one portion thereof mounted on a pivot 22, its diametrically opposite portion being pivotally connected at 23 to a ram 24 which is fixed to the aircraft structure. Thus the frame 20, together with the vanes 21 carried thereby, may be pivotally moved between the ful line position, in which the vanes 21 are disposed immediately adjacent to and beneath the final nozzle 17, and the dotted line position, in which the vanes 21 remain in the path of the exhaust gases and fan air but are spaced from the final nozzle 17.

The vanes 21 are pivotally movable by a common mechanism 25, independent of the means for pivotally moving the frame 20 (denoted by a broken line in FIGURE 3) so that they can be moved through an angle, e.g. of 5°, to either side of an axis perpendicular to the plane of the frame. When so pivoted, the various vanes 21 will appropriately deflect both the exhaust gases and the fan air so as to assist in the forward motion or in the braking of the aircraft. It will be appreciated that to obtain braking of the aircraft the vanes 21 are pivoted with the frame 20 disposed immediately to and beneath the final nozzle.

As will be seen in FIGURE 3, each vane 21 is substantially elliptical in section and is pivotally mounted about a horizontal axis 30 which is remote from the intersection of its major axis 31 with its minor axis 32. By providing vanes of this shape and so disposed for pivoting, a more efficient deflection of the gases passing between the vanes 21 may be achieved. If the frame 20 could only remain in the full line position, in which the vanes 21 are disposed immediately adjacent to the final nozzle, then when the vanes 21 are pivotally moved through the said angle of 5°, they would severely choke the flow of fan air and exhaust gases. Since, however, the frame 20 is movable to the dotted line position, such severe choking will not occur, because the exhaust gases and fan air will flow freely from the engine nozzle before striking the vanes 21 and being deflected thereby.

When vertical lift is required, the vanes 21 will be maintained vertical, and the frame 20 will be maintained in the full line position. When, however, forward thrust or braking is required, the frame 20 will be lowered to the dotted line position, and the vanes 21 will be appropriately pivoted about their axes. As will be seen, the movement of the frame 20 to the dotted line position will not only prevent the vanes 21 from choking the flow of exhaust gases and fan air but will also enable them to effect greater deflection of the flow of air and exhaust gases.

The ability to pivot the vanes 21 to either side of the axis perpendicular to the plane of the frame thereof may also be used to reduce yawing. For example, if the vanes 21 on the port side of the aircraft 10 are pivoted forwards 5°, while the vanes 21 on the starboard side of the aircraft 10 are pivoted aft 5°, this will have an effect on the yaw angle of the aircraft.

I claim:

1. An aircraft power plant comprising at least one vertical lift engine having a final nozzle, a plurality of vanes, each of said vanes being substantially elliptical in cross section and pivotally mounted about an axis perpendicular to the plane of said vane cross section and remote from the point of intersection of the major and minor axes of said vane, said vanes being mounted adjacent said final nozzle, means for causing each said vane to move about said mounting axis to vary the direction of flow from said final nozzle and moving means for moving said vanes from a first position immediately adjacent said final nozzle to a second position spaced from said final nozzle a predetermined distance while remaining in the flow path of said exhaust gases.

2. The power plant defined in claim 1 wherein said predetermined distance is the amount required to prevent choking of said engine when each said vane is pivoted about its mounting axis.

3. Power plant as claimed in claim 1 in which the vanes are carried by a common frame, means being provided for pivoting the frame so as to move the said vanes between the said first and second positions.

4. Power plant as claimed in claim 1 in which the engine is a fan engine whose fan air annularly surrounds the exhaust gases, the vanes being pivotally movable to vary the direction of flow of both the fan air and the exhaust gases, and the vanes remaining in the path of both the fan air and the exhaust gases when moved into the said second position.

5. Power plant as claimed in claim 1 wherein said mounting axis of each said vane is parallel to the plane of said final nozzle and in which each said vane may be pivotally moved through a predetermined angle to either side of a vertical position.

References Cited

UNITED STATES PATENTS

| | | | |
|---|---|---|---|
| 3,033,493 | 5/1962 | Wilde et al. | 244—52 |
| 3,100,377 | 8/1963 | Kosin et al. | 244—52 |
| 3,241,771 | 3/1966 | Erwin | 244—12 |

OTHER REFERENCES

German application No. 1,144,117, dated Feb. 2, 1963.

MILTON BUCHLER, Primary Examiner

JAMES E. PITTENGER, Assistant Examiner

U.S. Cl. X.R.

239—265.19